United States Patent
Wen et al.

(10) Patent No.: US 12,217,005 B2
(45) Date of Patent: Feb. 4, 2025

(54) INFORMATION PROCESSING METHOD AND APPARATUS, TERMINAL, AND STORAGE MEDIUM FOR OBTAINING AND DISPLAYING INFORMATION ON A TARGET ENTITY WORD REPRESENTING A PROJECT, A PRODUCT, OR A TASK IN A WORK COMMUNICATION

(71) Applicant: Beijing Zitiao Network Technology Co., Ltd., Beijing (CN)

(72) Inventors: Ji Wen, Beijing (CN); Wenhai Yang, Beijing (CN); Fangyuan Zeng, Beijing (CN); Chaolin Huang, Beijing (CN); Feng Wang, Beijing (CN); Dongxue Wu, Beijing (CN); Yuxin Jing, Beijing (CN); Xiao Wang, Beijing (CN); Chenghao Wang, Beijing (CN); Shuwei Liu, Beijing (CN); Hongyun Zhang, Beijing (CN); Chenguang Wang, Beijing (CN); Xing Shi, Beijing (CN); Xingguang Fan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/372,158

(22) Filed: Sep. 25, 2023

(65) Prior Publication Data
US 2024/0013002 A1 Jan. 11, 2024

Related U.S. Application Data

(63) Continuation of application No. PCT/CN2022/085393, filed on Apr. 6, 2022.

(30) Foreign Application Priority Data

Apr. 6, 2021 (CN) .......................... 202110368385.7
Apr. 6, 2021 (CN) .......................... 202110369365.1

(51) Int. Cl.
*G06F 40/295* (2020.01)
*G06F 40/186* (2020.01)
(Continued)

(52) U.S. Cl.
CPC .......... *G06F 40/295* (2020.01); *G06F 40/186* (2020.01); *G06Q 10/10* (2013.01); *H04W 24/10* (2013.01)

(58) Field of Classification Search
CPC ...... G06Q 10/10; G06F 40/186; H04W 24/10
(Continued)

(56) References Cited

U.S. PATENT DOCUMENTS

2005/0091327 A1* 4/2005 Koch ..................... G06Q 10/10
709/239
2008/0313534 A1 12/2008 Cheung et al.
(Continued)

FOREIGN PATENT DOCUMENTS

| CN | 101794291 A | 8/2010 |
|----|-------------|--------|
| CN | 105493082 A | 4/2016 |

(Continued)

OTHER PUBLICATIONS

International Patent Application No. PCT/CN2022/085393; Int'l Search Report; dated Jun. 28, 2022; 3 pages.
(Continued)

*Primary Examiner* — Farzad Kazeminezhad
(74) *Attorney, Agent, or Firm* — BakerHostetler

(57) ABSTRACT

The present disclosure provides an information processing method and apparatus, a terminal, and a storage medium. The information processing method, comprising: in response to a first operation event for a target entity word representing a project, a product, or a task in a work communication in displayed content, acquiring target entity word information associated with the target entity word,
(Continued)

Obtain, in response to a first operation event on a target entity word in display content, target entity word information associated with the target entity word — S11

Display the target entity word information — S12 wherein the target entity word information comprises first information and second information, the first information comprising the meaning of the target entity word, and the second information comprising a communication identifier of a communication group or contact associated with the target entity word; and displaying the target entity word information. According to the present disclosure, the meaning of the target entity word is displayed, and the communication group or contact associated with the target entity word is displayed, such that the user can quickly define the group or contact associated with the target entity word.

21 Claims, 7 Drawing Sheets

(51) Int. Cl.
    *G06Q 10/10*         (2023.01)
    *H04W 24/10*         (2009.01)

(58) Field of Classification Search
    USPC .......................................................... 709/239
    See application file for complete search history.

(56) References Cited

U.S. PATENT DOCUMENTS

| | | |
|---|---|---|
| 2009/0132969 A1 | 5/2009 | Mayer |
| 2011/0087691 A1 | 4/2011 | Han |
| 2016/0353310 A1* | 12/2016 | Gorny .................. G06F 40/186 |
| 2018/0150650 A1 | 5/2018 | Saunders et al. |
| 2018/0183619 A1 | 6/2018 | Jayaram et al. |

FOREIGN PATENT DOCUMENTS

| | | |
|---|---|---|
| CN | 106100982 A | 11/2016 |
| CN | 107944025 A | 4/2018 |
| CN | 109474847 A | 3/2019 |
| CN | 109600719 A | 4/2019 |
| CN | 109918669 A | 6/2019 |
| CN | 110263318 A | 9/2019 |
| CN | 110336683 A | 10/2019 |
| CN | 110413886 A | 11/2019 |
| CN | 111079030 A | 4/2020 |
| CN | 111526027 A | 8/2020 |
| CN | 111600729 A | 8/2020 |
| CN | 111708938 A | 9/2020 |
| CN | 112084268 A | 12/2020 |
| CN | 112287206 A | 1/2021 |
| CN | 113111647 A | 7/2021 |
| CN | 113111648 A | 7/2021 |
| JP | 2008-237846 A | 10/2008 |
| JP | 2022-533203 A | 7/2022 |
| WO | WO 2020/233444 A1 | 11/2020 |

OTHER PUBLICATIONS

Feng Rui et al.; "The Constrution of Learning Social Networking Sites in the Perspective Connectionism"; Journal of Distance Education; Issue 3; Apr. 2013; p. 10-16 (English Abstract on p. 16).

European Patent Application No. 22784069.1; Extended Search Report; dated Jun. 14, 2024; 9 pages.

Decision to Grant a Patent for Japanese Application No. 2023-561132, mailed Nov. 5, 2024, 5 pages.

* cited by examiner

PRD
Product Requirement Document
Definition: Product Requirement Document
Related personnel
Product: Zhang San, Li Si
Design: Wang Wu, Zhao Liu
Groups
PRD feedback group
PRD research and development group
Cloud documents
Design document_PRD
Related links
 Definition of XX encyclopedia
 2020.09.12
FIG. 2 cos     Clear | ×

Comprehensive   Message   Document   Application   Contact person   Group   Schedule Contact person: Fcos
Message: May I ask what is cos
Document: Introduction about the cos function
Group: cos discussion group
Group: cos technical discussion
Group message: Improvement plans for cos are to be posted in this group COS
cosine
Definition
Cosine function Related documents:
Introduction about the cos function
cos function and sin function Related link:
Platform entry Cos
Cos is the abbreviation for cosplay

FIG. 6

INFORMATION PROCESSING METHOD AND APPARATUS, TERMINAL, AND STORAGE MEDIUM FOR OBTAINING AND DISPLAYING INFORMATION ON A TARGET ENTITY WORD REPRESENTING A PROJECT, A PRODUCT, OR A TASK IN A WORK COMMUNICATION

CROSS REFERENCE

The present application is a continuation of PCT Application No. PCT/CN2022/085393, titled "INFORMATION PROCESSING METHOD AND APPARATUS, TERMINAL, AND STORAGE MEDIUM", filed on Apr. 6, 2022, which is based on and claim priority to both Chinese Patent Application No. 202110369365.1, filed on Apr. 6, 2021, titled "INFORMATION PROCESSING METHOD AND APPARATUS, TERMINAL, AND STORAGE MEDIUM", and Chinese Patent Application No. 202110368385.7, filed on Apr. 6, 2021, titled "INFORMATION PROCESSING METHOD AND APPARATUS, TERMINAL, AND STORAGE MEDIUM", all of which are hereby incorporated by reference in their entireties.

TECHNICAL FIELD

The present disclosure relates to the field of computer technology, in particular to an information processing method and apparatus, a terminal, and a storage medium.

BACKGROUND

Users often frequently use various entity words such as abbreviations and professional terms in work communication to represent various projects, products, and the like. For new members or personnel in other fields who encounter these entity words during communication, they do not understand and often search to understand the meanings of these entity words.

SUMMARY

The present disclosure provides an information processing method and apparatus, a terminal, and a storage medium. The following technical solutions are used in this disclosure.

In some embodiments, the disclosure provides an information processing method, comprising:
  obtaining, in response to a first operation event on a target entity word in display content, target entity word information associated with the target entity word, wherein the target entity word information comprises first information and second information, the first information comprises a meaning of the target entity word, and the second information comprises a communication identifier of a communication group or contact person having an association relationship with the target entity word;
  displaying the target entity word information.

In some embodiments, the disclosure provides information processing apparatus, comprising:
  an obtaining unit, configured to obtain, in response to a first operation event on a target entity word in display content, target entity word information associated with the target entity word, wherein the target entity word information comprises first information and second information, the first information comprises a meaning of the target entity word, and the second information comprises a communication identifier of a communication group or contact person having an association relationship with the target entity word;
  a display unit, configured to display the target entity word information.

In some embodiments, the disclosure provides a terminal, comprising: at least one memory and at least one processor, wherein
  the at least one memory is configured to store program code, and the at least one processor is configured to call the program code stored in the at least one memory to perform the method above.

In some embodiments, the disclosure provides a storage medium, the storage medium storing program code, and the program code is used for performing the method above.

According to the information processing method provided in the embodiments of the present disclosure, the meaning of the target entity word is displayed, so that the user can know the meaning of the target entity word. The communication identifier of the communication group or contact person associated with the target entity word is also displayed, so that the user can quickly find and join the group or contact person associated with the target entity word.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended marks indicate identical or similar elements. It should be understood that the accompanying drawings are schematic and that the elements and components are not necessarily drawn to scale.

FIG. 2 is a schematic diagram of display of entity word information according to an embodiment of the present disclosure.

FIG. 6 is a schematic diagram of display of search results and target entity word information according to an embodiment of the present disclosure.

DETAILED DESCRIPTION OF PREFERRED EMBODIMENTS

Embodiments of the present disclosure will be described in greater detail below with reference to the accompanying drawings. While certain embodiments of the present disclosure are shown in the accompanying drawings, it should be understood that the present disclosure may be implemented in various forms and should not be construed as being limited to the embodiments set forth herein, but instead are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in sequence and/or in parallel. In addition, the method embodiments may include additional steps and/or omit to perform the steps illustrated. The scope of the present disclosure is not limited in this regard.

As used herein, the term "including" and variations thereof are open-ended, i.e., "including, but not limited to". The term "based on" is "based, at least in part, on". The term "an embodiment" means "at least one embodiment"; the term "another embodiment" means "at least one additional embodiment"; the term "some embodiments" means "at least some embodiments". Definitions of other terms will be given in the description below.

Note that the concepts "first" and "second" mentioned in this disclosure are used only to distinguish between different devices, modules or units, and are not intended to define the order or interdependence of the functions performed by these devices, modules or units.

It should be noted that the reference to "one" in this disclosure is intended to be schematic and not limiting, and it should be understood by those skilled in the art to mean "one or more" unless the context clearly indicates otherwise.

The names of the messages or information interacting between the multiple devices in this disclosure are for illustrative purposes only and are not intended to limit the scope of those messages or information.

The embodiments of the present application are described in detail below in conjunction with the accompanying drawings.

In work communication of users, entity words such as abbreviations and pronouns are often used to represent various projects, products, processes, and the like. However, new members may not be able to understand the meanings of these words and usually need to search for their meanings. This method is inefficient. In addition, users do not know whether the entity words are used in other related services after knowing their meanings, and cannot quickly locate associated service using the entity words. As a result, users need to repeatedly query the entity words in the future, causing inconvenience.

Figure 1:
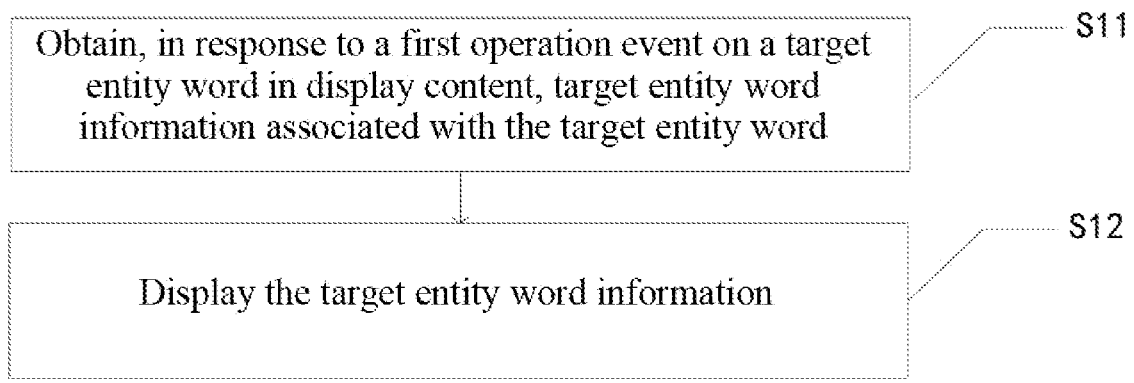
FIG. 1 is a flowchart of an information processing method according to an embodiment of the present disclosure.

An embodiment of the present disclosure provides an information processing method, as shown in FIG. 1. FIG. 1 is a flowchart of an information processing method according to an embodiment of the present disclosure. The information processing method includes steps S11 and S12 below. The method provided in the embodiment of the present disclosure may be applied to a terminal, such as a mobile phone or a computer, and may be applied to software in the terminal, such as an instant messaging client.

S11: Obtain, in response to a first operation event on a target entity word in display content, target entity word information associated with the target entity word.

In some embodiments, the display content is displayed in a display interface, and may be text information or image information displaying text information, such as an instant messaging message, task information, or project information. The target entity word is any one or more entity words in the display content, and the entity words may be abbreviations, idioms, rare phrases, customized words, and the like. A user may assign the target entity word in the display content by executing the first operation event. The first operation event may be, for example, a click operation. It should be noted that the first operation event may include one or more operations, and the first operation event may be completed by executing a plurality of operation steps instead of just one operation. The target entity word information includes first information and second information. The first information includes a meaning of the target entity word, for example, if the target entity word is an abbreviation, the meaning of the target entity word may be a full name, definition, or the like of the target entity word. The second information includes a communication identifier of a communication group or contact person having an association relationship with the target entity word. The communication group may be a group in instant messaging software. The communication identifier of the communication group may be, for example, one or two of a group name or a group icon in the communication group. The association relationship between the communication group and the target entity word may be preset, for example, the association relationship with the communication group is created when the entity word information of the entity word is created. In other embodiments, the association relationship between the communication group and the target entity word is determined according to a label of the communication group, where the communication group may have the label. After the target entity word is determined, a label of the communication group is searched. In a case that the label of the communication group includes the target entity word, it is determined that the two have the association relationship. For example, the contact person may include, for example, a creator of the target entity word information and a person having an association relationship with the target entity word. The association relationship between the target entity word and the contact person may be pre-established, for example, the association relationship is created when the target entity word information is created. The communication identifier may be a text, an icon, or the like.

S12: Display the target entity word information.

In some embodiments, when the target entity word information is displayed, an additional display window is opened for display. In other embodiments, the target entity word information is displayed in the display content, for example, a bracket is added behind the target entity word to display the target entity word information, or a floating window is displayed to display the target entity word information, and a position of the floating window may be adjusted, that is, the user may change the position of the floating window as needed.

In some embodiments of the present disclosure, the method provided in the present disclosure is used in the field of instant messaging, and the display content may be an instant messaging message. In this case, the user may perform the first operation event on the instant messaging message to query the target entity word information of the target entity word in the instant messaging message, where the target entity word information may be displayed above the instant messaging message. In other embodiments of the present disclosure, the method provided in the present disclosure is used in the field of electronic documents. The electronic document may be an online document. In this case, the display content may be document content in the electronic document, the user may perform the first operation event on the target entity word in the electronic document, and the target entity word information may be displayed in the electronic document. A corresponding operation target is performed in response to a second operation event on the displayed entity word information. Optionally, in response to an operation on the communication identifier of the communication group in the entity word information, the communication group is joined or entered according to an affiliation relationship between the current user and the communication group. Therefore, a jump from the online document to the instant messaging group is achieved, and communication efficiency is improved.

In other embodiments, the method provided in the present disclosure is used in the search field, where the display content may be any display content, such as web page content, the target entity word may be searched content, and the target entity word information may be a search result.

The following is an optional embodiment. For example, instant messaging software uses the method in the embodiments of the present disclosure. A server of the instant messaging software stores entity words and entity word information. A user receives communication information in a display interface of the instant messaging software, the communication information having an entity word PRD. The user performs a first trigger event on the entity word PRD to obtain entity word information of the entity word PRD (target entity word) from the server and display the entity word information, as shown in FIG. 2. FIG. 2 schematically displays entity word information of the entity word PRD. From the figure, it may be seen that a meaning of the entity word PRD is displayed in the entity word information, so that the user may know the meaning of the entity word without searching. On the other hand, the entity word information also displays communication identifiers of communication groups and contact persons associated with the entity word PRD. In FIG. 2, the communication identifiers of the communication groups are "PRD feedback group" and "PRD research and development group". In FIG. 2, the communication identifiers of contact persons include "Zhang San", "Li Si", "Wang Wu", and "Zhao Liu". In this way, the user may know which communication groups and contact persons are related to the target entity word, and joint these groups or pay attention and contact relevant contact persons during communication in these groups.

In some embodiments of the present disclosure, the meaning of the target entity word is displayed to enable the user to know the meaning of the target entity word, and the communication group associated with the target entity word is displayed to enable the user to quickly define the group associated with the target entity word.

In some embodiments, a project is often associated with a plurality of groups. After joining a new project, the user may need to join a plurality of groups of the project or contact a plurality of contact persons. However, in face of many groups and contact persons, it is difficult for the user to quickly locate relevant groups and contact persons, and it is also difficult for members in the project to remember all the groups. After the method provided in the present application is used and after the user performs the first operation event on the target entity word in the project, the user may quickly determine groups and contact persons associated with the target entity word, quickly join the relevant groups, and search the relevant contact persons. Therefore, work efficiency and user experience are improved.

In some embodiments of the present disclosure, the information processing method further includes: joining or entering the communication group according to an affiliation relationship between a current user and the communication group in response to a second operation event on the communication identifier of the communication group. In some embodiments, the user may directly operate through the communication identifier of the communication group to join or enter the communication group without searching the communication group again according to the name of the communication group. Joining the communication group refers to becoming a member of the communication group, and entering the communication group refers to entering the group in a case of having become the member of the communication group, for example, entering a chat interface of the group.

In some embodiments of the present disclosure, the information processing method includes: determining the affiliation relationship between the current user and the communication group in response to an operation on the communication identifier of the communication group; displaying an operation option of the communication group corresponding to the affiliation relationship according to the affiliation relationship; and joining or entering the communication group in response to an operation on the operation option.

In some embodiments, the communication identifier of the communication group may be a group avatar or a group name, as shown in FIG. 2. The "PRD feedback group" and "PRD research and development group" in the group chat in FIG. 2 are group names of the communication groups, and corresponding group icons may also be displayed. For example, the operation on the communication identifier may be, for example, click on the communication identifier. After the communication identifier of the communication group is operated, the affiliation relationship between the current user and the communication group may be obtained, the affiliation relationship is used for indicating whether the current user belongs to the communication group corresponding to the operated communication identifier. Then the operation option is displayed. The affiliation relationship corresponds to the operation option, and different affiliation relationships correspond to different operation options. According to different operation options, the user may join the communication group or enter the communication group. Joining the communication group may refer to becoming a member of the communication group, and entering the communication group may refer to entering the interface of the communication group in a case that the current user has been the member of the communication group. In some embodiments of the present disclosure, the communication identifier in the target entity information can be directly operated to join or enter the communication group, and the user does not need to search groups to join or enter the communication group, thereby reducing user's operation steps.

In some embodiments of the present disclosure, the displaying an operation option of the communication group corresponding to the affiliation relationship according to the affiliation relationship includes: displaying an option of entering the communication group if the current user belongs to the communication group; or displaying an option of joining the communication group if the current user does not belong to the communication group.

In some embodiments, if the current user belong to the communication group, the user does not need to join the communication group first; or if the user has not joined the communication group, the user needs to join the communication group first and then enter the communication group. Therefore, in a case of different affiliation relationships, the displayed options are different, and the user enters or joins a communication group by triggering an option.

In some embodiments of the present disclosure, the obtaining, in response to a first operation event on a target entity word in display content, target entity word information associated with the target entity word includes: obtaining, in response to the first operation event on an abbreviation or pronoun in a communication message or document content, a full name of the abbreviation or a formal name of the pronoun, where the target entity word includes the abbreviation or pronoun, and the first information includes the full name of the abbreviation or the formal name of the pronoun.

In some embodiments, during communication through the instant messaging client, entity words such as abbreviations and pronouns may be used in communication messages or received documents to replace some names, whereby communication time costs may be reduced for users who are familiar with the entity words, but communication difficulties may arise for users who are not familiar with the entity words. Therefore, in some embodiments, the target entity word information may include an abbreviation or pronoun, and the obtained first information includes a full name of the abbreviation or a formal name of the pronoun. If the abbreviation is in a non-local language, the full name of the abbreviation may further include a name after the full name corresponding to the abbreviation is translated into a local language.

In some embodiments of the present disclosure, the obtaining, in response to a first operation event on a target entity word in display content, target entity word information associated with the target entity word includes: recognizing entity words in the display content, and displaying the entity words in a first style in the display content, the first style is different from a display style of content except the entity words in the display content; and determining, in response to a trigger operation on any entity word, that the triggered entity word is the target entity word and obtaining the target entity word information associated with the target entity word.

In some embodiments, personalized entity word display styles may be customized for users, association relationships between the current user and entity words are determined, and based on the association relationships, the entity words are displayed in the display content in the display styles corresponding to the association relationships. The association relationships may be determined based on user authorized organization relationships, service duration, service directions, and the like, respectively. Each association relationship may be displayed in a different, identical, or incompletely identical display style.

In some embodiments, a database may be pre-built, the database storing entity words and associated entity word information. The display content may be compared with the entity words stored in the database. In a case that the display content has an entity word stored in the database, the entity word in the display content is recognized. In order to distinguish the display, the display style of the entity word is changed into the first style, for example, the entity word may be displayed by highlighting or increasing an underline. In this way, the user may directly determine which content is the entity word through the display style. When entity words are determined according to the content stored in the database, it may ensure that all the entity words have entity word information, without exception.

In some embodiments of the present disclosure, the obtaining, in response to a first operation event on a target entity word in display content, target entity word information associated with the target entity word includes: displaying a target control in response to a selection operation on at least a portion of the display content, determining that the selected content is the target entity word in response to a trigger operation on the target control, and obtaining the target entity word information associated with the target entity word. In some embodiments, at least one of the display color, display brightness, display font, and display font size of the first style is different from that of the style of the content except the entity word in the display content.

Figure 3:
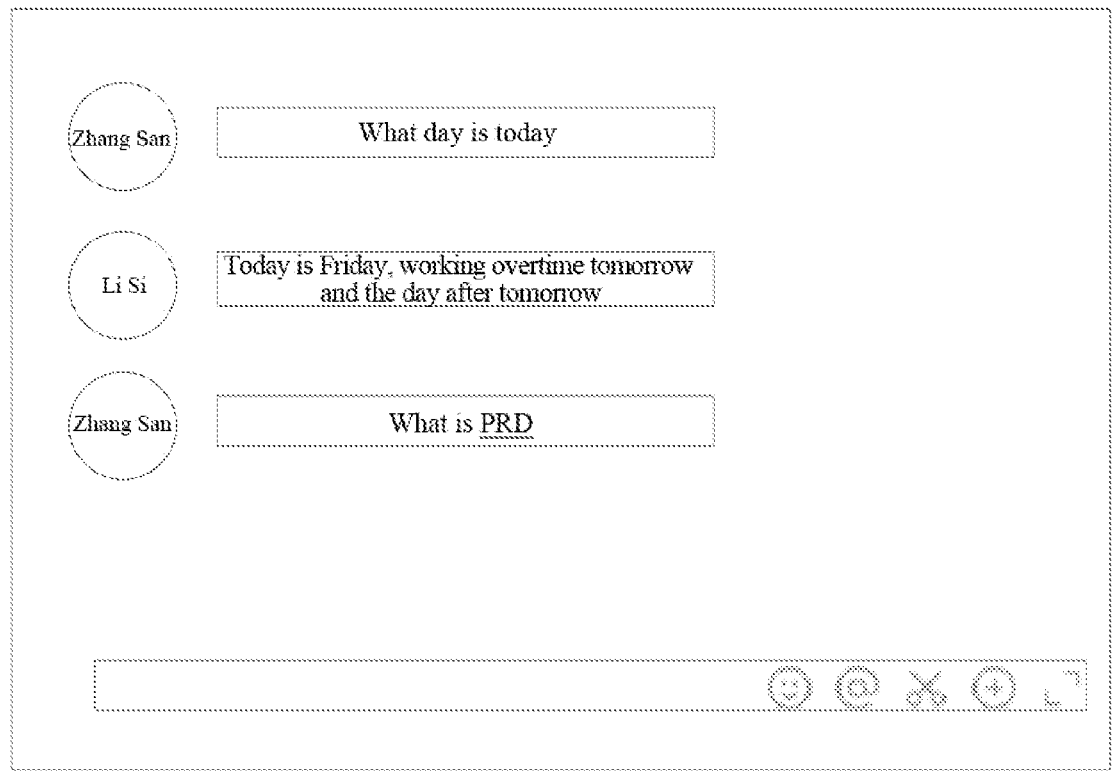
FIGS. 3, 4, and 5 are schematic diagrams of an information processing method according to some embodiments of the present disclosure.
Figure 4:
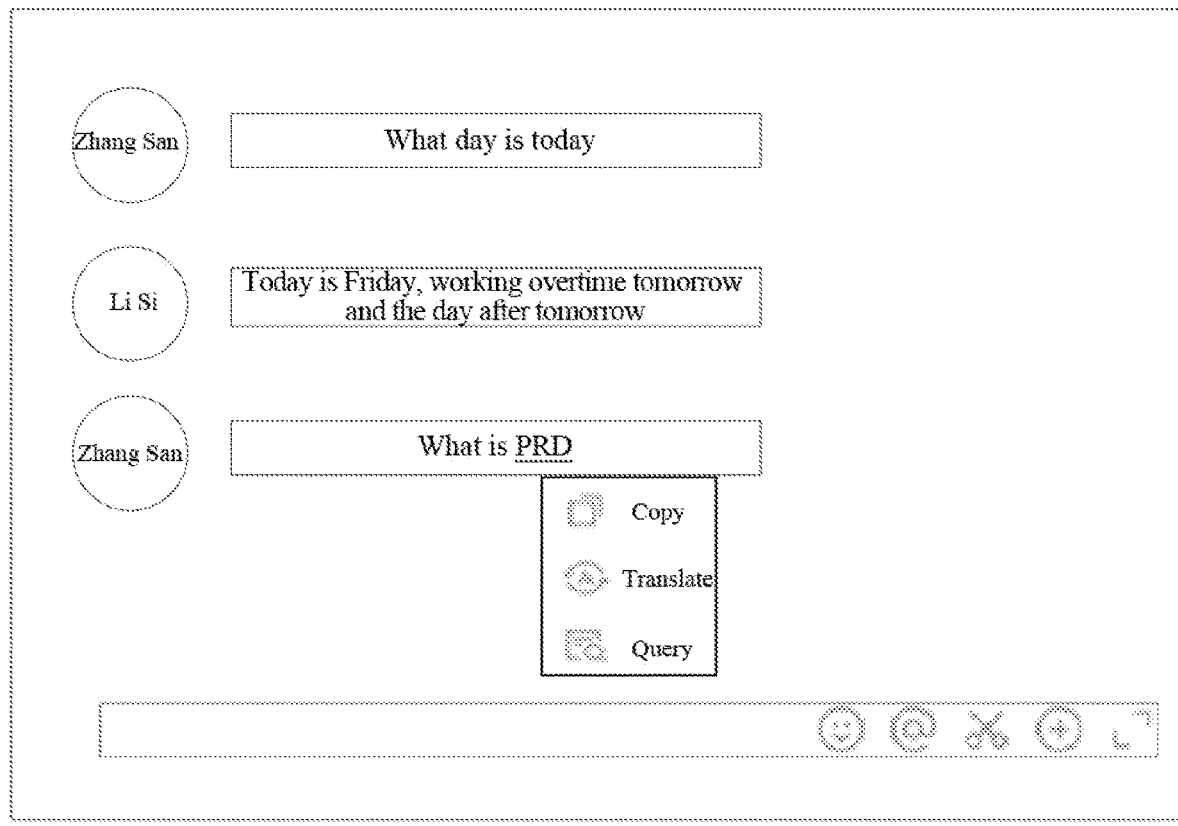
Figure 5:
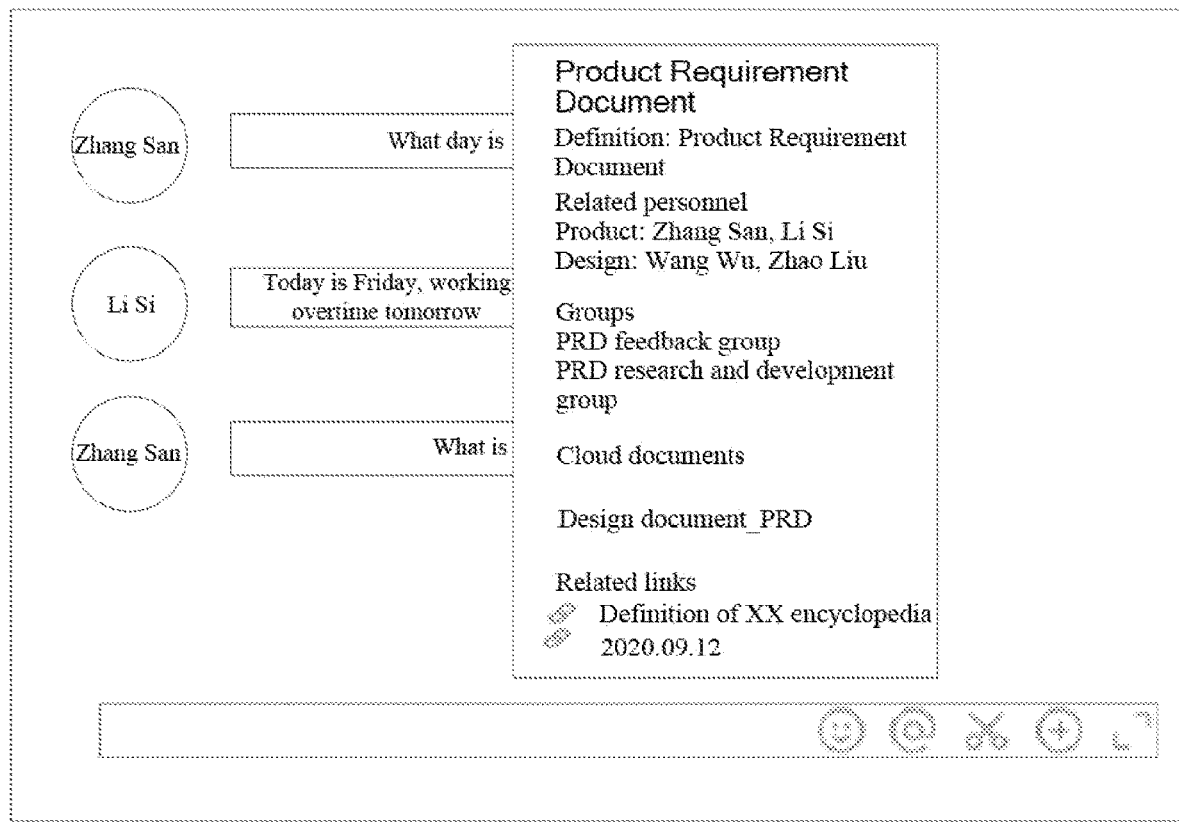

In some embodiments, reference may be made to FIG. 3 to FIG. 5. FIG. 3 displays an entity word PRD. The user selects the entity word by dragging a mouse, as shown in FIG. 4. A target control may be displayed after selection. The target control may be "Query" shown in FIG. 4. The target control is triggered to display target entity word information associated with the target entity word, as shown in FIG. 5. In some embodiments of the present disclosure, the target entity word may be selected by the user, so that the user may determine the target entity word according to a requirement. Moreover, because the target entity word information is displayed after the target control is triggered, false triggering is unlikely to occur and a normal selection operation will not be hindered.

In some embodiments of the present disclosure, the obtaining, in response to a first operation event on a target entity word in display content, target entity word information associated with the target entity word includes: obtaining the target entity word information associated with the entity word in response to an input operation on the target entity word in a first input box. In some embodiments, reference is made to FIG. 6. FIG. 6 shows a first input box. A target entity word "cos" is input in the first input box, and then an input operation is performed by pressing Enter or clicking an OK button to obtain target entity word information associated with the target entity word. The first input box may be a search box in an instant messaging client, and may be used for searching content in the instant messaging client, as shown in FIG. 6. When content is searched in the instant messaging client, the target entity word information (in the right region of FIG. 6) is also displayed in addition to the results of search in the instant messaging client (in the left region of FIG. 6).

In some embodiments of the present disclosure, the information processing method further includes: if the target entity word information is empty, displaying a first view with first preset information; or if the target entity word information is not obtained, displaying a first view with second preset information, where the first preset information is different from the second preset information.

In some embodiments, the target entity word information may be obtained from a server. After a request for obtaining the target entity word information is sent to the server, there may be three results: 1, a return result is received, the return result showing that the target entity word information has been successfully obtained; 2, a result is received, the result showing that the target entity word has no corresponding target entity word information; and 3, no return result is received (the target entity word information is not obtained). If the return result is received but the result shows no associated target entity word information, the first preset information needs to be displayed to inform the user of the current state. The first preset information may be, for example, "temporarily no content". If the target entity word information is not received within preset duration, the second preset information needs to be displayed, the second preset information may be, for example, "fail to load", thereby informing the user of the current state.

In some embodiments of the present disclosure, if the target entity word information is not obtained, the first view also displays an obtaining identifier, the obtaining identifier is used for obtaining the target entity word information after a third operation is performed. In some embodiments, the target entity word information may not be obtained due to accidents such as network disruption, so the obtaining identifier is provided to re-obtain the target entity word information.

In some embodiments of the present disclosure, the displaying the target entity word information associated with the target entity word includes: displaying the first view on an upper layer of the display content, and displaying the target entity word information in the first view.

In some embodiments, the first view different from a view where the display content is located is created, and the target entity word information is displayed in the first view, where the first view may be displayed above the display content in a suspended manner. In some embodiments, a size of the first view may be adjusted and its position may be moved to prevent the first view from blocking the display content. Optionally, the first view does not block the display content. Displaying the target entity word information by displaying the first view may avoid interference between the target entity word information and the display content. In some embodiments, the method further includes closing the first view in response to an operation on a region outside the first view, thereby displaying or closing the first view according to user's needs.

In some embodiments of the present disclosure, the first view is displayed in an associated region of the target entity word. In some embodiments, the associated region of the target entity word may be, for example, near the target entity word, and the associated region may move with the movement of the target entity word. For example, in a case that the user slides the display content by sliding the screen, the associated region of the target entity word also moves with the movement of the target entity word. By setting the first view in the associated region of the target entity word, the position of the target entity word information may be close to that of the target entity word to facilitate user viewing, and the user may view other content in the display content without closing the target entity word information. In some embodiments, the first view may be displayed in a semi-transparent style, which may prevent blocking other content in the display content.

In other embodiments of the present disclosure, the first view is displayed in a preset region of the display interface. In some embodiments, the preset region of the display interface may be, for example, an edge region of the display interface. By setting a separate preset region to display the first view, the user can accurately learn the display position of the target entity word information without searching the first view. In some embodiments, the preset region may be selected by the user and its size and position may be adjusted.

In some embodiments of the present disclosure, the first view has a preset data structure, and the preset data structure has at least one data display region used for displaying an associated type of data; and the data in the target entity word information are displayed in the preset data structure according to the data type. In some embodiments, the first view, for example, may be a card. One or more data display regions are preset in the preset data structure of the first view, and a type of data to be displayed is preassigned to each data display region. In this way, after the target entity word information is obtained, the corresponding data display region is determined and displayed according to the data type for the content in the target entity word information. For example, reference may be made to FIG. 2. A data type used for display is preassigned to each region of the view in FIG. 2. This method may enable the display of the target data information to be more readable, and solves problems of irregular display of obtained target data information and inconvenient reading for users.

In some embodiments of the present disclosure, the target entity word information further includes at least one of the following: a name of the entity word, a full name of the entity word, a document identifier of an electronic document associated with the entity word, a link identifier of a page associated with the entity word, an entity word information edit identifier, an evaluation identifier, a jump identifier, a feedback identifier, and an information source identifier. In some embodiments, the communication identifier of the contact person includes at least one of the following: a person identifier of a creator of the entity word information, and a personnel identifier of a communication person associated with the entity word.

In some embodiments, the name of the target entity word refers to a target entity word displayed in the display content. The full name of the target entity word generally refers to a name slightly longer than the name of the entity word, such as a full name of an abbreviation. The communication person associated with the target entity word refers to a person pre-associated with the target entity word, and the associated personnel may be set when the creator of the target entity word creates the entity word information. Reference may be made to FIG. 2. "Zhang San", "Li Si", "Wang Wu", and "Zhao Liu" recorded in the entries "Product" and "Design" in FIG. 2 are all communication identifiers of contact persons of the entity word. The electronic document associated with the target entity word may be a document that introduces the target entity word, or the like. The association relationship between the electronic document and the target entity word may be set by any user having a permission. In some embodiments, when the user has the permission to edit the entity word information, the edit identifier may also be displayed for editing the entity word information. In some embodiments, the feedback identifier is used for submitting feedback on the target entity word information, and the information source identifier is used for indicating a source of the entity word information, for example, the source may be a database, a book, or a web page.

In some embodiments, the communication identifier of the contact person is triggered to display person information of the contact person and/or a message input region; the person information may be a brief introduction of the person, and the message input region may be, for example, an input box in some embodiments; and the message input region is used for inputting a communication message, and the communication message input to the message input region can be sent to the contact person. In this way, after triggering the communication identifier of the contact person, the user may input a message through the message input region and directly send the message to the contact person corresponding to the triggered communication identifier without searching the contact person, so as to quickly communicate with the contact person.

In some embodiments, the document identifier is used for displaying the electronic document associated with the entity word after being triggered, where the electronic document may be displayed by opening a browser or by opening the electronic document in the first view.

In some embodiments, the link identifier is used for opening the page associated with the entity word after being triggered. In some embodiments, the page associated with the entity word includes an information source page of the target entity word information. In some embodiments, the entity word information edit identifier is used for displaying an entity word information edit view after being triggered, and the entity word information may be edited on the entity word information edit view.

In some embodiments, the evaluation identifier is used for representing an evaluation on the entity word information after being triggered. In some embodiments, feedback from the user on the target entity word information may be obtained by setting the evaluation identifier, so as to help improve. For example, buttons about the finger up and down in FIG. 6 may be evaluation identifiers used for representing likes and clicks on the entity word information.

In some embodiments, the jump identifier is used for opening a detail page of the entity word information in a server after being triggered. In some embodiments, the content of the entity word information may be too much to be fully displayed, so the jump identifier is provided to jump to the detail page of the entity word stored in the server, so as to facilitate the user to better understand the content of the entity word.

In some embodiments of the present disclosure, the displaying the target entity word information includes: determining the number of pieces of the target entity word information; and if the number of pieces of the target entity word information is one, displaying the target entity word information in a first position of the first view; or if the number of pieces of the target entity word information is at least two, determining one piece of to-be-displayed entity word information from the at least two pieces of target entity word information, displaying the to-be-displayed entity word information in a first position of the first view, and displaying other target entity word information in a second position of the first view, or displaying abbreviated information of other target entity word information in a second position. In some embodiments, a target entity word may be associated with a plurality of pieces of target entity word information. For example, an abbreviation may have a plurality of full names. In this case, a piece of to-be-displayed entity word information needs to be determined and displayed in the first position of the first view. The target entity word information except the to-be-displayed entity word information is displayed in the second position, for example, displayed in a form of a thumbnail. The first position may be more prominent than the second position in the first view, for example, the first position is usually located above the second position, and the display area of the first position may be larger than that of the second position.

In some embodiments, as shown in FIG. 6, two pieces of target entity word information associated with COS are displayed, one is related information of a cosine function displayed on the upper right side of FIG. 6, and the other is related information of cosplay displayed on the lower right side of FIG. 6, where the related information of the cosine function is to-be-displayed entity word information, and the related information of cosplay only displays abbreviated information.

In some embodiments of the present disclosure, the determining one piece of to-be-displayed entity word information from the at least two pieces of target entity word information includes: obtaining an evaluation on each piece of target entity word information, and determining the target entity word information with an optimal evaluation as the to-be-displayed entity word information. In some embodiments, the user may evaluate the target entity word information. The evaluation may be counted by scoring. For example, identifiers of likes and clicks may be displayed. One score is added if the target entity word information is liked, and one score is subtracted if the entity word information is clicked. In this way, which entity word information is recognized by the user can be known after user feedbacks are collected for a long time.

In some embodiments of the present disclosure, the determining one piece of to-be-displayed entity word information from the at least two pieces of target entity word information includes: obtaining user information of the current user, determining a degree of correlation between the target entity word information and the current user based on the user information, and determining the target entity word information with a highest degree of correlation as the to-be-displayed entity word information. In some embodiments, when the target entity word has a plurality of pieces of associated target entity word information, which piece of entity word information is most likely to be learned by the user is determined in combination with the user information of the user. The degree of correlation may be computed according to the occupation, age, and the like of the user. For example, relevant and similar fields may be set for each occupation, a degree of correlation between the occupation of the user and each field may be preset, and the degree of correlation is determined according to the occupation of the user and the field of the entity word. For example, the entity word "AI" may represent "artificial intelligence" or software. If the user information shows that the user is an algorithm engineer, the target entity word information is entity word information about artificial intelligence.

In some embodiments of the present disclosure, the determining the target entity word information with an optimal evaluation as the to-be-displayed entity word information includes: if there is target entity word information with the same evaluation, obtaining an information abundance of the target entity word information, and determining the target entity word information with a highest information abundance as the to-be-displayed entity word information. In some embodiments, if there is target entity word information with the same evaluation, the information abundance of the entity word information is determined. The information abundance is used for representing an amount of information, and the higher information abundance indicates a larger amount of information. For example, the abundance of the information may be determined through the number of types of the information included in the target entity word information. The types of the information may include, for example, the full name of the entity word, a definition of the entity word, the source of the entity word, the document associated with the entity word, and the page associated with the entity word. The user desires to fully understand the target entity word as much as possible, so the target entity word information with higher information abundance is preferentially displayed.

In some embodiments of the present disclosure, after the abbreviated information of any piece of target entity word information is triggered, all of the target entity word information corresponding to the abbreviated information is displayed; or after the abbreviated information of any piece of target entity word information is triggered, the detail page of the target entity word information corresponding to the abbreviated information in the server is opened. In some embodiments, some content is hidden in the target entity word information displayed in the form of abbreviated information, so the abbreviated information may be triggered by clicking or the like to display complete target entity word information, or the detail page associated with the target entity word that is stored in the server is displayed.

In some embodiments of the present disclosure, the method further includes: obtaining a search result for the target entity word and displaying the search result in the second view, where the target entity word information is displayed in the first view, and the first view and the second view are independent of each other in the same display interface for display. In some embodiments, the display interface has a first view and a second view, and the first view and the second view may be pop-up windows or two regions in the display interface. In some embodiments, the first view and the second view are independent of each other for display. For the first view and the second view that are independent of each other for display, when the display content (search result) in the second view is flipped or scrolled, the display content (target entity word information) in the first view will not be flipped or scrolled accordingly. Similarly, when the display content in the first view is flipped or scrolled, the display content in the second view will not be flipped or scrolled.

In some embodiments of the present disclosure, the search result of the entity word is displayed in the second view, and the target entity word information is displayed in the first view, so that the user can know which content involves the target entity word, know the meaning of the target entity word, and better know the meaning of the content in the search result by referring to the meaning of the target entity word. Moreover, in some embodiments of the present disclosure, the first view and the second view are independent of each other for display, so that when the user slides, scrolls, or flip the search result in the second view, the first view may keep displaying the target entity word information. In this case, when the user views each piece of content in the search result, because the first view keeps displaying the target entity word information, the user may compare the content with the entity word information at any time to understand the meaning of the search result, thereby avoiding a problem that the entity word information in the first view cannot be viewed due to the sliding, scrolling, or flipping on the second view, and improving user experience.

In some embodiments of the present disclosure, the obtaining a search result for the target entity word includes: searching user data of the current user to obtain user data including the target entity word, where the user data of the current user include at least one of a communication message, a contact person, an application, an email, a schedule, and a document.

In some embodiments, the user often encounters an incomprehensible entity word during chatting, email communication, document view, or the like. The user does not need to know which online content is related to the target entity word, but needs to know which content related to the user includes the target entity word. Therefore, in some embodiments of the present disclosure, the user data are searched. The user data may be, for example, local data of the user. For example, when the method in the embodiments of the present disclosure may be used for a terminal such as a computer or mobile phone, the local data of the terminal such as a computer or mobile phone may be searched. When the method in the embodiments of the present disclosure is used for an instant messaging client, the user data may be data of the user in the instant messaging client. It should be noted that the user data may include not only data sent and input by the user, but also data received by the user.

In order to better explain the method provided in the embodiments of the present disclosure, a specific embodiment is provided with reference to FIG. 6. Refer to FIG. 6, which schematically displays a display interface. The upper part of FIG. 6 shows a search box, and a user inputs a target entity word "COS" for search. The lower left side of FIG. 6 shows a second view, and the second view displays search results, including contact persons, messages, documents, groups, group messages. The lower right side of FIG. 6 shows a first view, and the first view displays target entity word information of the target entity word "COS". In this embodiment, the target entity word information displays a meaning of the COS. In this embodiment, the search results of the target entity word are obtained from local user data. The target entity word information of the target entity word may be obtained from a server and displayed, so that the user may know desired target entity word information, and may quickly locate previously sent or received information associated with the target entity word without secondary search. In addition, when the user slides the search results in the second view, the content displayed in the first view will not change accordingly, thereby avoiding a problem that the target entity word information cannot be viewed after the user slides the search results. In some embodiments, after any result among the search results is triggered, an original source location of the triggered result is displayed in the first view. For example, after "Message: May I ask what is cos" displayed in FIG. 6 is triggered, the first view jumps to the original source location of the message, that is, a chat interface where the message is located, to facilitate the user to view relevant previous and subsequent statements.

In some embodiments, as shown in FIG. 6, the name of the target entity word "COS" is "COS", while "cosine" is a full name of the target entity word, and the content displayed in the definition is the meaning of the target entity word. In some cases, the target entity word information further has an associated communication group. The association relationship between the communication group and the target entity word may be assigned when the entity word information is created, or a label is set for the target communication group. In a case that the label includes the target entity word, it is determined that there is an association relationship between the two. The group identifier of the communication group may be, for example, a group name or icon. In some embodiments, as shown in FIG. 6, "cos function introduction" and "cos function and sin function" are document links of electronic documents associated with the target entity word. After the document link is triggered, the corresponding document may be opened for user viewing. In some embodiments, "Platform entry" in FIG. 6 is a link to a page associated with the entity word, and is used for opening the associated page. In other embodiments, the target entity word information further has an identifier for jumping to a preset communication interface. After the identifier is triggered, the display interface jumps to the preset communication interface. The preset communication interface may be a communication interface for obtaining assistance or a communication interface of an author who created the entity word information. In some embodiments, the target entity word information has various types of information related to the target entity word, and the user may easily obtain desired information from the entity word information displayed in the first view and quickly jump to the desired information. In some embodiments, when the target entity word information in the first view is triggered to switch the content displayed in the first view, the display content displayed in the second view remains unchanged.

In some embodiments, the entity word is searched in a case-insensitive manner to obtain search results and entity word information; or the entity word is searched in a case-sensitive manner to obtain search results and entity word information. In some embodiments, the entity word may include English letters. The entity word may be, for example, an abbreviation in English. The entity word including English letters is searched in a case-insensitive manner. For example, all the English letters in the entity word may be converted into uppercases or lowercases, all English letters in the database may also be converted into uppercases and lowercases, and case sensitivity does not need to be considered during comparison with data in the database. In other embodiments, a case-sensitive manner may also be used. The case-sensitive manner requires that the search results and the entity word information are identical to the entity word. In this case, case sensitivity is required. The case sensitivity may be selected, for example, an option box may be provided in the display interface, and if the option box is checked, the case sensitivity is required, otherwise the case sensitivity is not required. During search, the entity word may be compared with entries, English names, Chinese terms, and the like in the database.

In some embodiments of the present disclosure, an information processing apparatus is further provided, including:

an obtaining unit, configured to obtain, in response to a first operation event on a target entity word in display content, target entity word information associated with the target entity word, where the target entity word information includes first information and second information, the first information includes a meaning of the target entity word, and the second information includes a communication identifier of a communication group or contact person having an association relationship with the target entity word; and a display unit, configured to display the target entity word information.

In some embodiments, the information processing apparatus further includes: a control unit, configured to join or enter the communication group according to an affiliation relationship between a current user and the communication group in response to a second operation event on the communication identifier of the communication group.

In some embodiments, the joining or entering the communication group according to an affiliation relationship between a current user and the communication group in response to a second operation event on the communication identifier of the communication group includes: determining the affiliation relationship between the current user and the communication group in response to an operation on the communication identifier of the communication group; displaying an operation option of the communication group corresponding to the affiliation relationship according to the affiliation relationship; and joining or entering the communication group in response to an operation on the operation option.

In some embodiments of the present disclosure, the displaying an operation option of the communication group corresponding to the affiliation relationship according to the affiliation relationship includes: displaying an option of entering the communication group if the current user belongs to the communication group; or displaying an option of joining the communication group if the current user does not belong to the communication group.

In some embodiments, the obtaining unit obtaining, in response to a first operation event on a target entity word in display content, target entity word information associated with the target entity word includes: obtaining, in response to the first operation event on an abbreviation or pronoun in a communication message or document content, a full name of the abbreviation or a formal name of the pronoun, where the target entity word includes the abbreviation or pronoun, and the first information includes the full name of the abbreviation or the formal name of the pronoun.

In some embodiments, the obtaining unit obtaining, in response to a first operation event on a target entity word in display content, target entity word information associated with the target entity word includes: recognizing entity words in the display content, and displaying the entity words in a first style in the display content, the first style is different from a display style of content except the entity words in the display content; and determining, in response to a trigger operation on any entity word, that the triggered entity word is the target entity word and obtaining the target entity word information associated with the target entity word; or displaying a target control in response to a selection operation on at least a portion of the display content, determining that the selected content is the target entity word in response to a trigger operation on the target control, and obtaining the target entity word information associated with the target entity word; or obtaining the target entity word information associated with the target entity word in response to an input operation on the target entity word in a first input box.

In some embodiments, at least one of the display color, display brightness, display font, and display font size of the first style is different from that of the style of the content except the entity word in the display content.

In some embodiments of the present disclosure, if the target entity word information is empty, a first view with first preset information is displayed; or if the target entity word information is not obtained, a first view with second preset information is displayed, where the first preset information is different from the second preset information.

In some embodiments, if the target entity word information is not obtained, the first view also displays an obtaining identifier, the obtaining identifier is used for obtaining the target entity word information after a third operation is performed.

In some embodiments, the display unit displaying the target entity word information associated with the target entity word includes: displaying the first view on an upper layer of the display content, and displaying the target entity word information in the first view.

In some embodiments, the first view is displayed in an associated region of the target entity word; or the first view is displayed in a preset region of the display interface. In some embodiments, the first view has a preset data structure, and the preset data structure has at least one data display region used for displaying an associated type of data; and the data in the target entity word information are displayed in the preset data structure according to the data type.

In some embodiments, the target entity word information further includes at least one of the following: a name of the target entity word, a full name of the target entity word, a document identifier of an electronic document associated with the target entity word, a link identifier of a page associated with the target entity word, an entity word information edit identifier, an evaluation identifier, a jump identifier, a feedback identifier, and an information source identifier.

In some embodiments, the document identifier is used for displaying the electronic document associated with the entity word after being triggered; or the link identifier is used for opening the page associated with the entity word after being triggered; or the entity word information edit identifier is used for displaying an entity word information edit view after being triggered; or the evaluation identifier is used for representing an evaluation on the entity word information after being triggered; or the jump identifier is used for opening a detail page of the entity word information in a server after being triggered.

In some embodiments, the communication identifier of the contact person is triggered to display person information of the contact person and/or a message input region; and the message input region is used for inputting a communication message, and the communication message input to the message input region can be sent to the contact person.

In some embodiments, the display unit displaying the target entity word information includes: determining the number of pieces of the target entity word information; if the number of pieces of the target entity word information is one, displaying the target entity word information in a first position of the first view; if the number of pieces of the target entity word information is at least two, determining one piece of to-be-displayed entity word information from the at least two pieces of target entity word information, displaying the to-be-displayed entity word information in a first position of the first view, and displaying other target entity word information in a second position of the first view, or displaying abbreviated information of other target entity word information in a second position.

In some embodiments, the display unit determining one piece of to-be-displayed entity word information from the at least two pieces of target entity word information includes: obtaining an evaluation on each piece of target entity word information, and determining the target entity word information with an optimal evaluation as the to-be-displayed entity word information; or obtaining user information of the current user, determining a degree of correlation between the target entity word information and the current user based on the user information, and determining the target entity word information with a highest degree of correlation as the to-be-displayed entity word information.

In some embodiments, the determining the target entity word information with an optimal evaluation as the to-be-displayed entity word information includes: if there is target entity word information with the same evaluation, obtaining an information abundance of the target entity word information, and determining the target entity word information with a highest information abundance as the to-be-displayed entity word information. In some embodiments, after the abbreviated information of any piece of target entity word information is triggered, all of the target entity word information corresponding to the abbreviated information is displayed; or after the abbreviated information of any piece of target entity word information is triggered, the detail page of the target entity word information corresponding to the abbreviated information in the server is opened.

In some embodiments, the obtaining unit is further configured to obtain a search result for the target entity word, and the display unit is further configured to display the search result in the second view, where the target entity word information is displayed in the first view, and the first view and the second view are independent of each other in the same display interface for display.

In some embodiments, the obtaining unit obtaining a search result for the target entity word includes: searching user data of the current user to obtain user data including the target entity word, where the user data of the current user include at least one of a communication message, a contact person, an application, an email, a schedule, and a document.

For embodiments of the device, which essentially correspond to the method embodiment, it is sufficient to refer to the method embodiment for a partial description where relevant. The above described embodiments of the device are only schematic, where the modules described as separate modules may or may not be separate. Some or all of these modules may be selected according to actual needs to achieve the purpose of this embodiment. It can be understood and implemented by a person of ordinary skill in the art without creative labor.

Above, the method and apparatus of the present disclosure are described based on embodiments and application examples. In addition, the present disclosure provides a terminal and a storage medium, which are described below.

Figure 7:
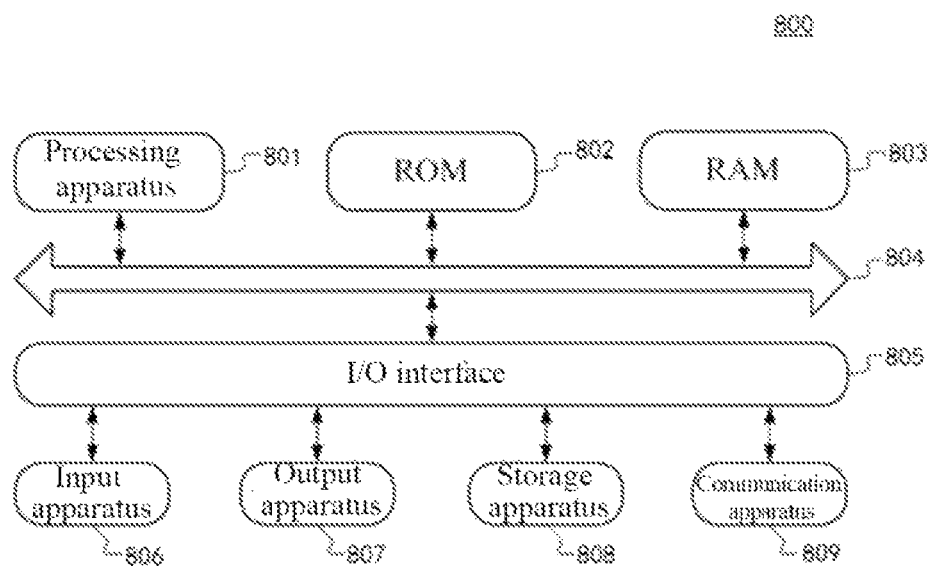
FIG. 7 is a schematic structural diagram of an electronic device according to an embodiment of the present disclosure.

Reference is made below to FIG. 7, which illustrates a schematic diagram of the structure of an electronic device (e.g., a terminal device or a server) 800 suitable for implementing an embodiment of the present disclosure. Terminal devices in embodiments of the present disclosure may include, but are not limited to, mobile terminals such as a cell phone, a laptop computer, a digital radio receiver, a PDA (personal digital assistant), a PAD (tablet computer), a PMP (portable multimedia player), an in-vehicle terminal (e.g., an in-vehicle navigation terminal), and the like, and a fixed terminal such as a digital TV, a desktop computer, and the like. The electronic device illustrated in the figures is only an example and should not impose any limitation on the functionality and scope of use of the embodiments of the present disclosure.

The electronic device 800 may include a processing device (e.g., central processor, graphics processor, etc.) 801 that may perform various appropriate actions and processes based on programs stored in a read-only memory (ROM) 802 or loaded from a storage apparatus 808 into a random access memory (RAM) 803. Also stored in RAM 803 are various programs and data required for the operation of electronic device 800. The processing apparatus 801, ROM 802, and RAM 803 are connected to each other via bus 804. The input/output (I/O) interface 805 is also connected to the bus 804.

Typically, the following devices can be connected to I/O interface 805: input apparatus 806 including, for example, touch screens, touch pads, keyboards, mice, cameras, microphones, accelerometers, gyroscopes, etc.; output apparatus 807 including, for example, liquid crystal displays (LCDs), speakers, vibrators, etc.; storage apparatus 808 including, for example, magnetic tapes, hard drives, etc.; and communication apparatus 809, communication apparatus 809 may allow the electronic device 800 to communicate wirelessly or wired with other devices to exchange data. Although the drawings illustrate the electronic device 800 with various devices, it should be understood that it is not required to implement or have all of the devices illustrated. More or fewer devices may alternatively be implemented or available.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program code for performing the method shown in the flowchart. In such an embodiment, the computer program may be downloaded and installed from a network via a communication apparatus 809, or from a storage apparatus 808, or from a ROM 802. When this computer program is executed by the processing apparatus 801, the above-described functions as defined in the method of this disclosed embodiment are performed.

It is to be noted that the computer-readable medium described above in this disclosure may be a computer-readable signal medium or a computer-readable storage medium or any combination of the above. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above, magnetic memory devices, or any suitable combination of the foregoing. In the present disclosure, a computer-readable storage medium may be any tangible medium that contains or stores a program that may be used by or in combination with an instruction execution system, device, or device. And in the present disclosure, a computer-readable signal medium may include a data signal propagated in the baseband or as part of a carrier wave that carries computer-readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in combination with the instruction execution system, device or device. The program code contained on the computer-readable medium may be transmitted using any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LAN"), wide area networks ("WAN"), internetworks (e.g., the Internet), and end-to-end networks (e.g., ad hoc end-to-end networks), as well as any currently known or future developed networks.

The above computer readable medium may be contained in the above electronic device; or it may be present separately and not assembled into the electronic device.

The above computer readable medium carries one or more programs which, when executed by the electronic device, cause the electronic device to perform the method of the present disclosure as described above.

Computer program code for performing the operations of the present disclosure may be written in one or more programming languages or combinations thereof, said programming languages including object-oriented programming languages—such as Java, Smalltalk, C++, and also including conventional procedural programming languages—such as "C" language or similar programming languages. The program code may be executed entirely on the user's computer, partially on the user's computer, as a stand-alone package, partially on the user's computer and partially on a remote computer, or entirely on a remote computer or server. In the case of a remote computer, the remote computer may be connected to the user computer over any kind of network—including a local area network (LAN) or a wide area network (WAN)—or, alternatively, may be connected to an external computer (e.g., using an Internet service provider to connect over the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in the embodiments of the present disclosure may be implemented by means of software, or by means of hardware. Wherein, the name of the unit does not in some cases constitute a limitation on the unit itself.

The functions described above herein may be performed, at least in part, by one or more hardware logic components. For example, non-limitingly, exemplary types of hardware logic components that may be used include: field-programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. Machine readable media may include, but are not limited to, electronic, magnetic, optical, electromagnetic, infrared, or semiconductor systems, devices, or apparatus, or any suitable combination of the foregoing. More specific examples of machine-readable storage media would include one or more wire-based electrical connections, portable computer disks, hard disks, random access memory (RAM), read-only memory (ROM), erasable programmable read-only memory (EPROM or flash memory), optical fiber, convenient compact disk read-only memory (CD-ROM), optical storage devices, magnetic storage devices, or any suitable combination of the above any suitable combination of the above.

According to one or more embodiments of the present disclosure, provide an information processing method, comprising:

obtaining, in response to a first operation event on a target entity word in display content, target entity word information associated with the target entity word, wherein the target entity word information comprises first information and second information, the first information comprises a meaning of the target entity word, and the second information comprises a communication identifier of a communication group or contact person having an association relationship with the target entity word; and displaying the target entity word information.

According to one or more embodiments of the present disclosure, provide an information processing method, further comprising: joining or entering the communication group according to an affiliation relationship between a current user and the communication group in response to a second operation event on the communication identifier of the communication group.

According to one or more embodiments of the present disclosure, provide an information processing method, further comprises: determining the affiliation relationship between the current user and the communication group in response to an operation on the communication identifier of the communication group;

displaying an operation option of the communication group corresponding to the affiliation relationship according to the affiliation relationship; and joining or entering the communication group in response to an operation on the operation option.

According to one or more embodiments of the present disclosure, provide an information processing method, wherein the displaying an operation option of the communication group corresponding to the affiliation relationship according to the affiliation relationship comprises: displaying an option of entering the communication group if the current user belongs to the communication group; or displaying an option of joining the communication group if the current user does not belong to the communication group.

According to one or more embodiments of the present disclosure, provide an information processing method, wherein the obtaining, in response to a first operation event on a target entity word in display content, target entity word information associated with the target entity word comprises:

obtaining, in response to the first operation event on an abbreviation or pronoun in a communication message or document content, a full name of the abbreviation or a formal name of the pronoun, wherein the target entity word comprises the abbreviation or pronoun, and the first information comprises the full name of the abbreviation or the formal name of the pronoun.

According to one or more embodiments of the present disclosure, provide an information processing method, wherein the obtaining, in response to a first operation event on a target entity word in display content, target entity word information associated with the target entity word comprises:

recognizing entity words in the display content, and displaying the entity words in a first style in the display content, the first style is different from a display style of content except the entity words in the display content; and determining, in response to a trigger operation on any entity word, that the triggered entity word is the target entity word and obtaining the target entity word information associated with the target entity word;

or, displaying a target control in response to a selection operation on at least a portion of the display content, determining that the selected content is the target entity word in response to a trigger operation on the target control, and obtaining the target entity word information associated with the target entity word;

or, obtaining the target entity word information associated with the target entity word in response to an input operation on the target entity word in a first input box.

According to one or more embodiments of the present disclosure, provide an information processing method, at least one of the display color, display brightness, display font, and display font size of the first style is different from that of the style of the content except the entity word in the display content.

According to one or more embodiments of the present disclosure, provide an information processing method, further comprising: displaying a first view with first preset information if the target entity word information is empty; or displaying a first view with second preset information if the target entity word information is not obtained, wherein the first preset information is different from the second preset information.

According to one or more embodiments of the present disclosure, provide an information processing method, if the target entity word information is not obtained, the first view also displays an obtaining identifier, the obtaining identifier is used for obtaining the target entity word information after a third operation is performed.

According to one or more embodiments of the present disclosure, provide an information processing method, wherein the displaying the target entity word information associated with the target entity word comprises:

displaying the first view on an upper layer of the display content, and displaying the target entity word information in the first view.

According to one or more embodiments of the present disclosure, provide an information processing method, the first view is displayed in an associated region of the target entity word;

or, the first view is displayed in a preset region of the display interface.

According to one or more embodiments of the present disclosure, provide an information processing method, the first view has a preset data structure, and the preset data structure has at least one data display region used for displaying an associated type of data; and the data in the target entity word information are displayed in the preset data structure according to the data type.

According to one or more embodiments of the present disclosure, provide an information processing method, wherein the target entity word information further comprises at least one of the following: a name of the target entity word, a full name of the target entity word, a document identifier of an electronic document associated with the target entity word, a link identifier of a page associated with the target entity word, an entity word information edit identifier, an evaluation identifier, a jump identifier, a feedback identifier, and an information source identifier.

According to one or more embodiments of the present disclosure, provide an information processing method, the document identifier is used for displaying the electronic document associated with the entity word after being triggered; or the link identifier is used for opening the page associated with the entity word after being triggered; or the entity word information edit identifier is used for displaying an entity word information edit view after being triggered; or the evaluation identifier is used for representing an evaluation on the entity word information after being triggered; or the jump identifier is used for opening a detail page of the entity word information in a server after being triggered.

According to one or more embodiments of the present disclosure, provide an information processing method, the communication identifier of the contact person is triggered to display person information of the contact person and/or a message input region; and the message input region is used for inputting a communication message, and the communication message input to the message input region can be sent to the contact person.

According to one or more embodiments of the present disclosure, provide an information processing method, wherein the displaying the target entity word information comprises:

determining the number of pieces of the target entity word information; and if the number of pieces of the target entity word information is one, displaying the target entity word information in a first position of the first view; or if the number of pieces of the target entity word information is at least two, determining one piece of to-be-displayed entity word information from the at least two pieces of target entity word information, displaying the to-be-displayed entity word information in a first position of the first view, and displaying other target entity word information in a second position of the first view, or displaying abbreviated information of other target entity word information in a second position.

According to one or more embodiments of the present disclosure, provide an information processing method, wherein the determining one piece of to-be-displayed entity word information from the at least two pieces of target entity word information comprises:

obtaining an evaluation on each piece of target entity word information, and determining the target entity word information with an optimal evaluation as the to-be-displayed entity word information; or obtaining user information of the current user, determining a degree of correlation between the target entity word information and the current user based on the user information, and determining the target entity word information with a highest degree of correlation as the to-be-displayed entity word information.

According to one or more embodiments of the present disclosure, provide an information processing method, wherein the determining the target entity word information with an optimal evaluation as the to-be-displayed entity word information comprises:

if there is target entity word information with the same evaluation, obtaining an information abundance of the target entity word information, and determining the target entity word information with a highest information abundance as the to-be-displayed entity word information.

According to one or more embodiments of the present disclosure, provide an information processing method, after the abbreviated information of any piece of target entity word information is triggered, all of the target entity word information corresponding to the abbreviated information is displayed; or after the abbreviated information of any piece of target entity word information is triggered, the detail page of the target entity word information corresponding to the abbreviated information in the server is opened.

According to one or more embodiments of the present disclosure, provide an information processing method, further comprising: obtaining a search result for the target entity word, and displaying the search result in the second view, wherein the target entity word information is displayed in the first view, and the first view and the second view are independent of each other in the same display interface for display.

According to one or more embodiments of the present disclosure, provide an information processing method, wherein the obtaining a search result for the target entity word comprises: searching user data of the current user to obtain user data comprising the target entity word, wherein the user data of the current user comprise at least one of a communication message, a contact person, an application, an email, a schedule, and a document.

According to one or more embodiments of the present disclosure, provide an information processing apparatus, comprising:

an obtaining unit, configured to obtain, in response to a first operation event on a target entity word in display content, target entity word information associated with the target entity word, wherein the target entity word information comprises first information and second information, the first information comprises a meaning of the target entity word, and the second information comprises a communication identifier of a communication group or contact person having an association relationship with the target entity word; and a display unit, configured to display the target entity word information.

According to one or more embodiments of the present disclosure, provide a terminal, comprising: at least one memory and at least one processor;

wherein the at least one memory is configured to store program code, and the at least one processor is configured to call the program code stored in the at least one memory to perform the method according to any one of above.

According to one or more embodiments of the present disclosure, provide a storage medium, the storage medium storing program code, and the program code is used for performing the method according to any one of above.

The above description is only a better embodiment of the present disclosure and a description of the technical principles applied. It should be understood by those skilled in the art that the scope of the disclosure covered by the present disclosure is not limited to technical solutions formed by specific combinations of the above technical features, but should also cover other technical solutions formed by any combination of the above technical features or their equivalent features without departing from the above disclosed idea. For example, the above features are interchangeable with (but not limited to) technical features with similar functions disclosed in the present disclosure.

Further, while the operations are depicted in a particular order, this should not be construed as requiring that the operations be performed in the particular order shown or in sequential order. Multitasking and parallel processing may be advantageous in certain environments. Again, while several specific implementation details are included in the above discussion, these should not be construed as limiting the scope of the present disclosure. Certain features described in the context of separate embodiments may also be implemented in combination in a single embodiment. Conversely, the various features described in the context of a single embodiment may also be implemented in multiple embodiments individually or in any suitable sub-combination.

Although the present subject matter has been described using language specific to structural features and/or method logical actions, it should be understood that the subject matter as defined in the appended claims is not necessarily limited to the particular features or actions described above. Rather, the particular features and actions described above are merely exemplary forms of claim fulfillment.

What is claimed is:

1. An information processing method for improving online communication efficiency, comprising:
   displaying content in an interface of instant messaging or an interface of displaying an online document, wherein the displayed content comprises a target entity word representing a project, a product, or a task in work communication;
   in response to a first operation event performed by a user on the target entity word, obtaining target entity word information associated with the target entity word from a server, wherein the target entity word information comprises first information and second information, the first information comprises a meaning of the target entity word, and the second information comprises a communication identifier of a communication group having an association relationship with the target entity word;
   displaying the first information and the second information, the second information comprising the communication identifier of the communication group; and
   in response to a second operation event performed by the user on the communication identifier of the communication group, directly adding the user to the communication group or entering the communication group to improve the online communication efficiency.

2. The method according to claim 1, further comprising:
   joining or entering the communication group according to an affiliation relationship between a current user and the communication group in response to a second operation event on the communication identifier of the communication group.

3. The method according to claim 2, wherein the joining or entering the communication group according to an affiliation relationship between a current user and the communication group in response to a second operation event on the communication identifier of the communication group comprises:
   determining the affiliation relationship between the current user and the communication group in response to an operation on the communication identifier of the communication group;
   displaying an operation option of the communication group corresponding to the affiliation relationship according to the affiliation relationship; and
   joining or entering the communication group in response to an operation on the operation option.

4. The method according to claim 3, wherein the displaying an operation option of the communication group corresponding to the affiliation relationship according to the affiliation relationship comprises:
   displaying an option of entering the communication group if the current user belongs to the communication group; or
   displaying an option of joining the communication group if the current user does not belong to the communication group.

5. The method according to claim 1, wherein the displaying the target entity word information comprises:
   determining a number of pieces of the target entity word information; and
   if the number of pieces of the target entity word information is one, displaying the target entity word information in a first position of a first view; or
   if the number of pieces of the target entity word information is at least two, determining one piece of to-be-displayed entity word information from the at least two pieces of target entity word information, displaying the to-be-displayed entity word information in a first position of the first view, and displaying other target entity word information in a second position of the first view, or displaying abbreviated information of other target entity word information in a second position.

6. The method according to claim 5, wherein the determining one piece of to-be-displayed entity word information from the at least two pieces of target entity word information comprises:
   obtaining an evaluation on each piece of target entity word information, and determining the target entity word information with an optimal evaluation as the to-be-displayed entity word information; or
   obtaining user information of the current user, determining a degree of correlation between the target entity word information and the current user based on the user information, and determining the target entity word information with a highest degree of correlation as the to-be displayed entity word information.

7. The method according to claim 6, wherein the determining the target entity word information with an optimal evaluation as the to-be-displayed entity word information comprises:
   if there is target entity word information with a same evaluation, obtaining an information abundance of the target entity word information, and determining the target entity word information with a highest information abundance as the to-be-displayed entity word information.

8. The method according to claim 5, wherein
   after the abbreviated information of any piece of target entity word information is triggered, all of the target entity word information corresponding to the abbreviated information is displayed; or
   after the abbreviated information of any piece of target entity word information is triggered, a detail page of the target entity word information corresponding to the abbreviated information in the server is opened.

9. The method according to claim 1, wherein the obtaining, in response to a first operation event on a target entity word in display content, target entity word information associated with the target entity word comprises:
   obtaining, in response to the first operation event on an abbreviation or pronoun in a communication message or document content, a full name of the abbreviation or a formal name of the pronoun, wherein the target entity word comprises the abbreviation or pronoun, and the first information comprises the full name of the abbreviation or the formal name of the pronoun;
   and/or, wherein the obtaining, in response to a first operation event on a target entity word in display content, target entity word information associated with the target entity word comprises:

recognizing entity words in the display content, and displaying the entity words in a first style in the display content, the first style is different from a display style of content except the entity words in the display content; and determining, in response to a trigger operation on any entity word, that the triggered entity word is the target entity word and obtaining the target entity word information associated with the target entity word;

or displaying a target control in response to a selection operation on at least a portion of the display content, determining that the selected content is the target entity word in response to a trigger operation on the target control, and obtaining the target entity word information associated with the target entity word;

or obtaining the target entity word information associated with the target entity word in response to an input operation on the target entity word in a first input box.

10. The method according to claim 9, wherein
at least one of the display color, display brightness, display font, and display font size of the first style is different from that of the style of the content except the entity word in the display content.

11. The method according to claim 1, further comprising:
displaying a first view with first preset information if the target entity word information is empty; or
displaying a first view with second preset information if the target entity word information is not obtained, wherein
the first preset information is different from the second preset information.

12. The method according to claim 11, wherein
if the target entity word information is not obtained, the first view also displays an obtaining identifier, the obtaining identifier is used for obtaining the target entity word information after a third operation is performed.

13. The method according to claim 1, wherein the displaying the target entity word information associated with the target entity word comprises:
displaying a first view on an upper layer of the display content, and displaying the target entity word information in the first view;
wherein
the first view is displayed in an associated region of the target entity word; or
the first view is displayed in a preset region of the display interface.

14. The method according to claim 13, wherein
the first view has a preset data structure, and the preset data structure has at least one data display region used for displaying an associated type of data; and
the data in the target entity word information are displayed in the preset data structure according to the data type.

15. The method according to claim 1, wherein the target entity word information further comprises at least one of the following: a name of the target entity word, a full name of the target entity word, a document identifier of an electronic document associated with the target entity word, a link identifier of a page associated with the target entity word, an entity word information edit identifier, an evaluation identifier, a jump identifier, a feedback identifier, and an information source identifier.

16. The method according to claim 15, wherein
the document identifier is used for displaying the electronic document associated with the entity word after being triggered; or
the link identifier is used for opening the page associated with the entity word after being triggered; or
the entity word information edit identifier is used for displaying an entity word information edit view after being triggered; or
the evaluation identifier is used for representing an evaluation on the entity word information after being triggered; or
the jump identifier is used for opening a detail a detail page of the entity word information in a server after being triggered.

17. The method according to claim 1, further comprising:
obtaining a search result for the target entity word, and displaying the search result in a second view, wherein
the target entity word information is displayed in a first view, and the first view and the second view are independent of each other in the same display interface for display.

18. The method according to claim 17, wherein the obtaining a search result for the target entity word comprises: searching user data of the current user to obtain user data comprising the target entity word, wherein
the user data of the current user comprise at least one of a communication message, a contact person, an application, an email, a schedule, and a document.

19. The method according to claim 1, wherein
the communication identifier of the contact person is triggered to display person information of the contact person and/or a message input region; and
the message input region is used for inputting a communication message, and the communication message input to the message input region can be sent to the contact person.

20. A device, comprising:
at least one memory and at least one processor, wherein the at least one memory is configured to store program code, and the program code upon execution by the at least one processor causes the at least one processor to perform operations, the operations comprising:
displaying content in an interface of instant messaging or an interface of displaying an online document, wherein the displayed content comprises a target entity word representing a project, a product, or a task in work communication;
in response to a first operation event performed by a user on the target entity word, obtaining target entity word information associated with the target entity word from a server, wherein the target entity word information comprises first information and second information, the first information comprises a meaning of the target entity word, and the second information comprises a communication identifier of a communication group having an association relationship with the target entity word;
displaying the first information and the second information, the second information comprising the communication identifier of the communication group; and
in response to a second operation event performed by the user on the communication identifier of the communication group, directly adding the user to the communication group or entering the communication group to improve online communication efficiency.

21. A non-transitory computer-readable storage medium storing instructions which, when executed by a processor, cause the processor to perform operations, the operations comprising:

displaying content in an interface of instant messaging or an interface of displaying an online document, wherein the displayed content comprises a target entity word representing a project, a product, or a task in work communication;

in response to a first operation event performed by a user on the target entity word, obtaining target entity word information associated with the target entity word from a server, wherein the target entity word information comprises first information and second information, the first information comprises a meaning of the target entity word, and the second information comprises a communication identifier of a communication group having an association relationship with the target entity word;

displaying the first information and the second information, the second information comprising the communication identifier of the communication group; and in response to a second operation event performed by the user on the communication identifier of the communication group, directly adding the user to the communication group or entering the communication group to improve online communication efficiency.

* * * * *